Aug. 15, 1967  L. F. MEDITZ  3,335,977
CONVERTIPLANE

Filed June 16, 1965  8 Sheets-Sheet 1

INVENTOR.
Ludwig F. Meditz
BY
Polachek & Saulsbury
ATTORNEYS.

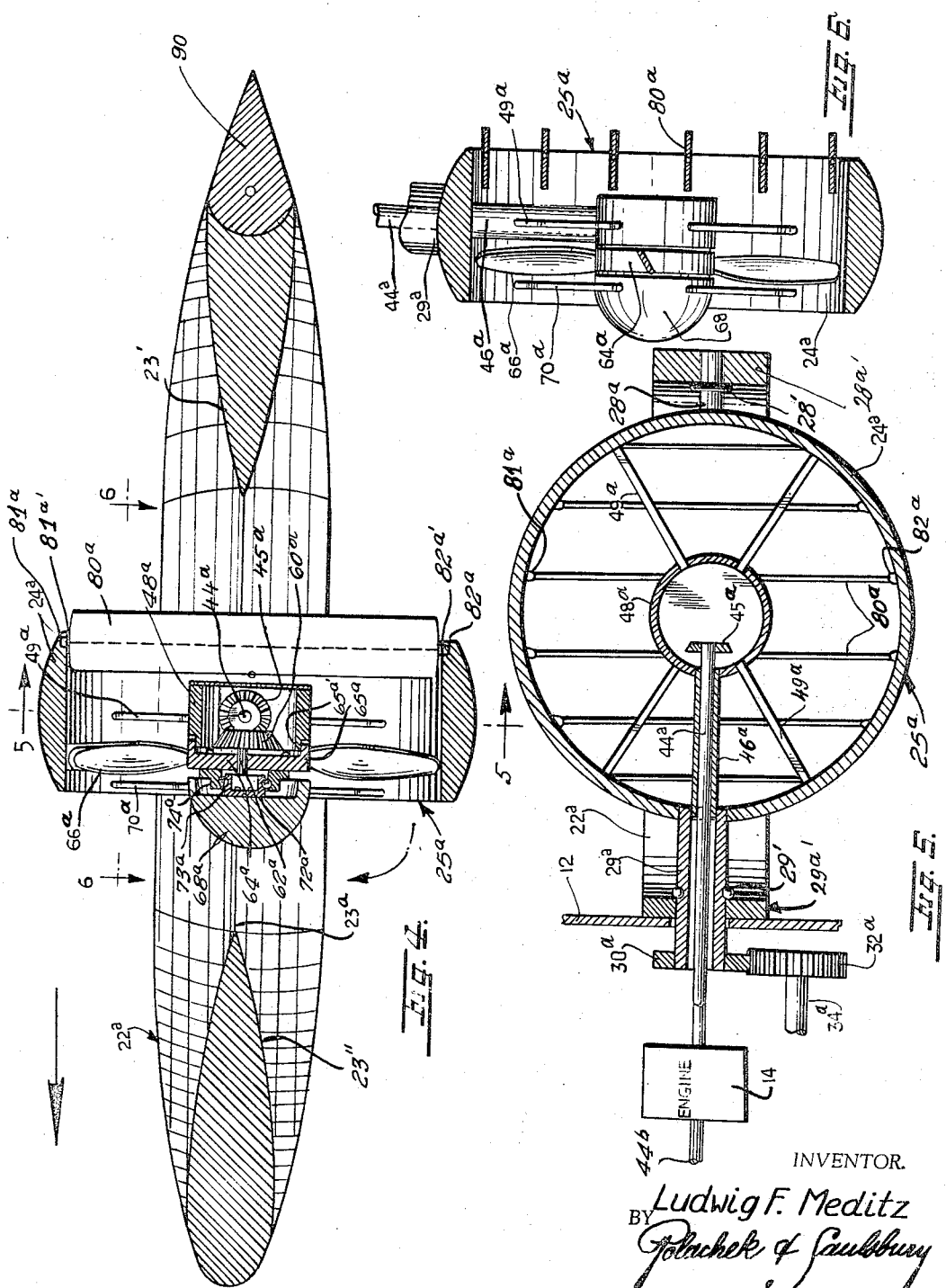

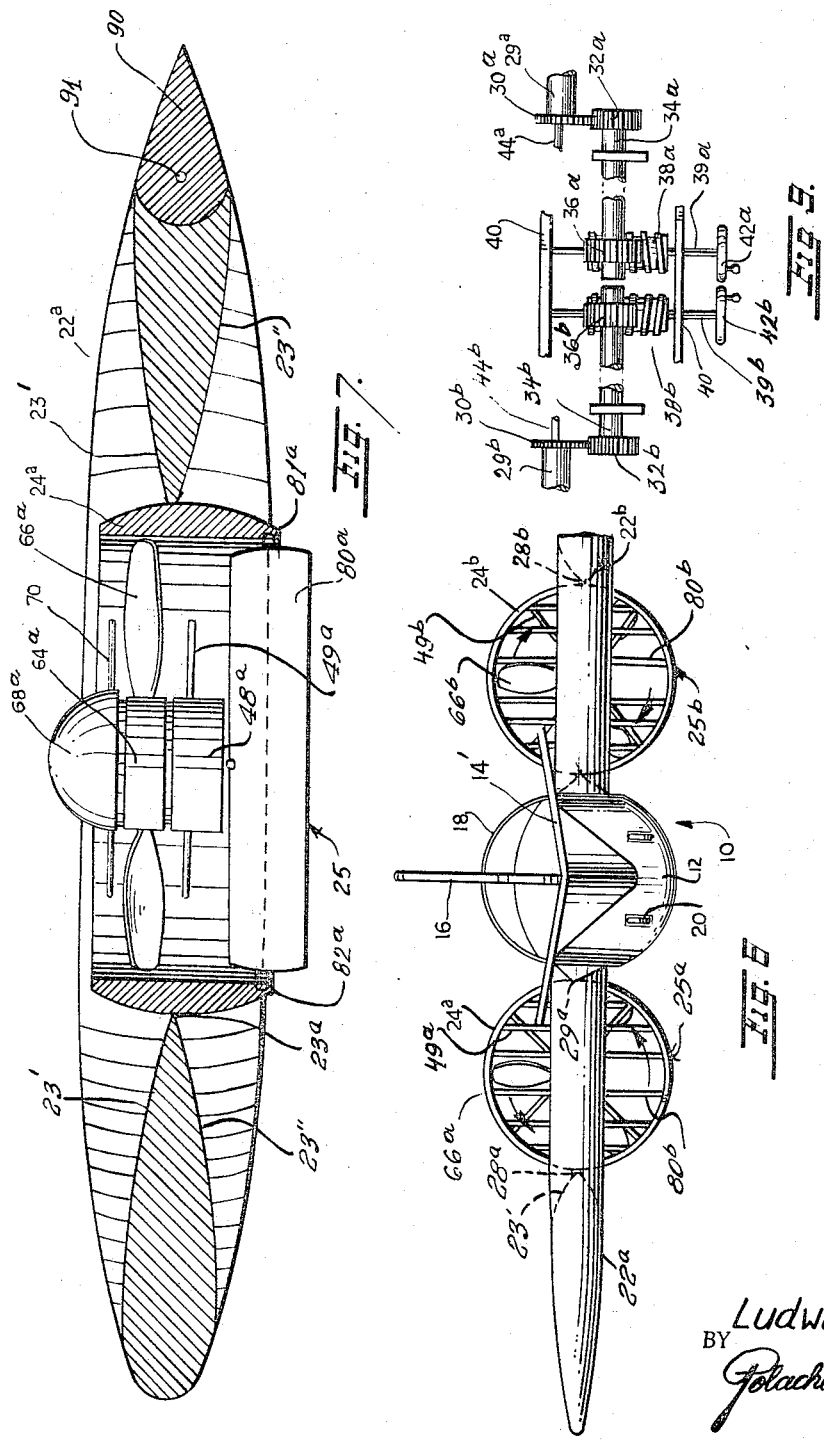

Aug. 15, 1967 L. F. MEDITZ 3,335,977
CONVERTIPLANE
Filed June 16, 1965 8 Sheets-Sheet 4
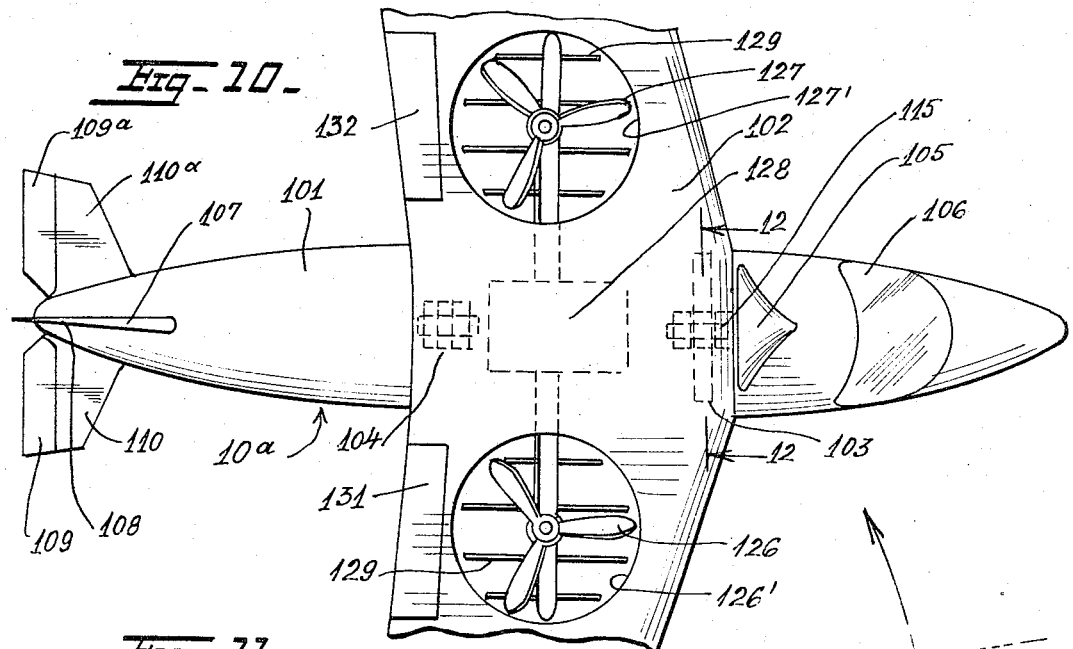
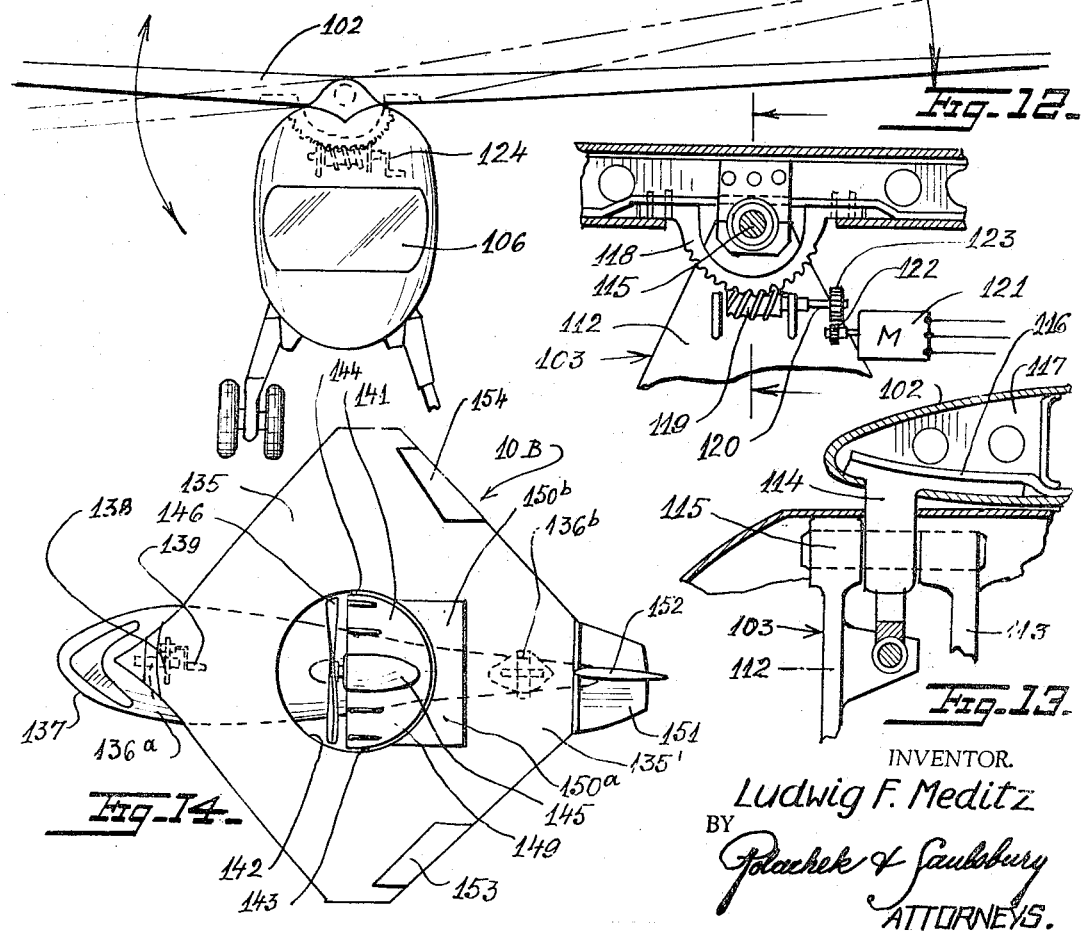
INVENTOR.
Ludwig F. Meditz
BY
Polachek & Saulsbury
ATTORNEYS.

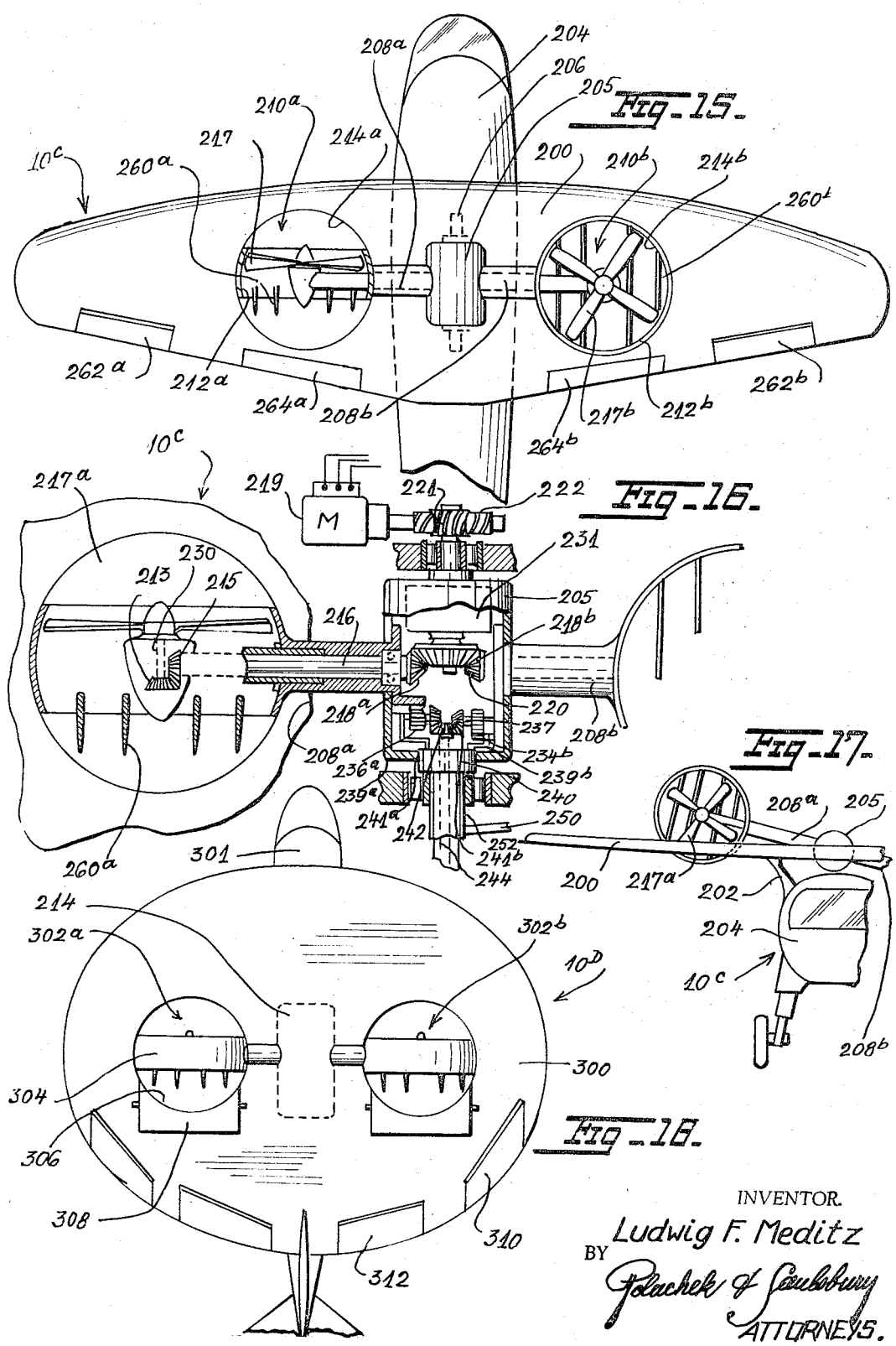

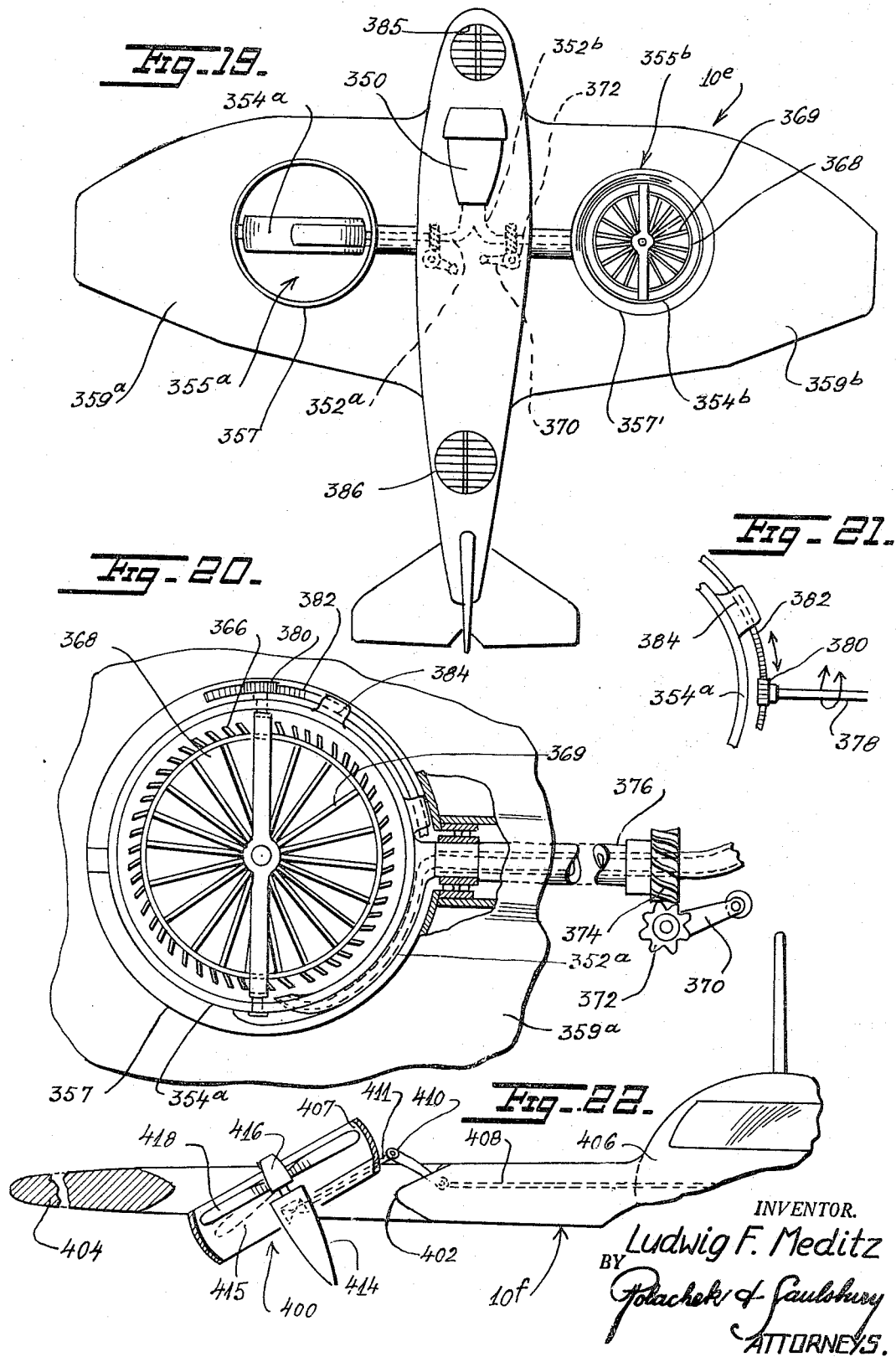

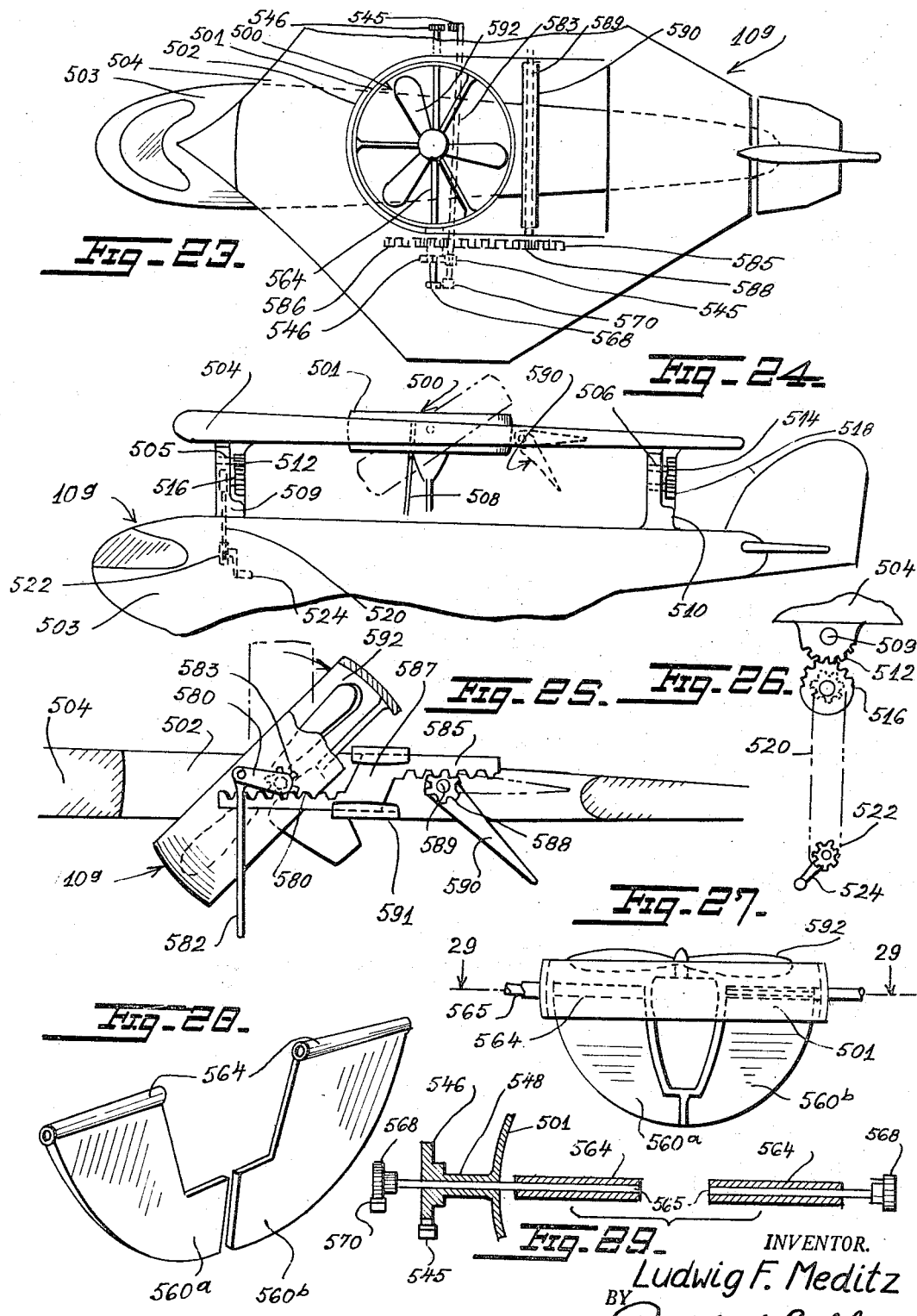

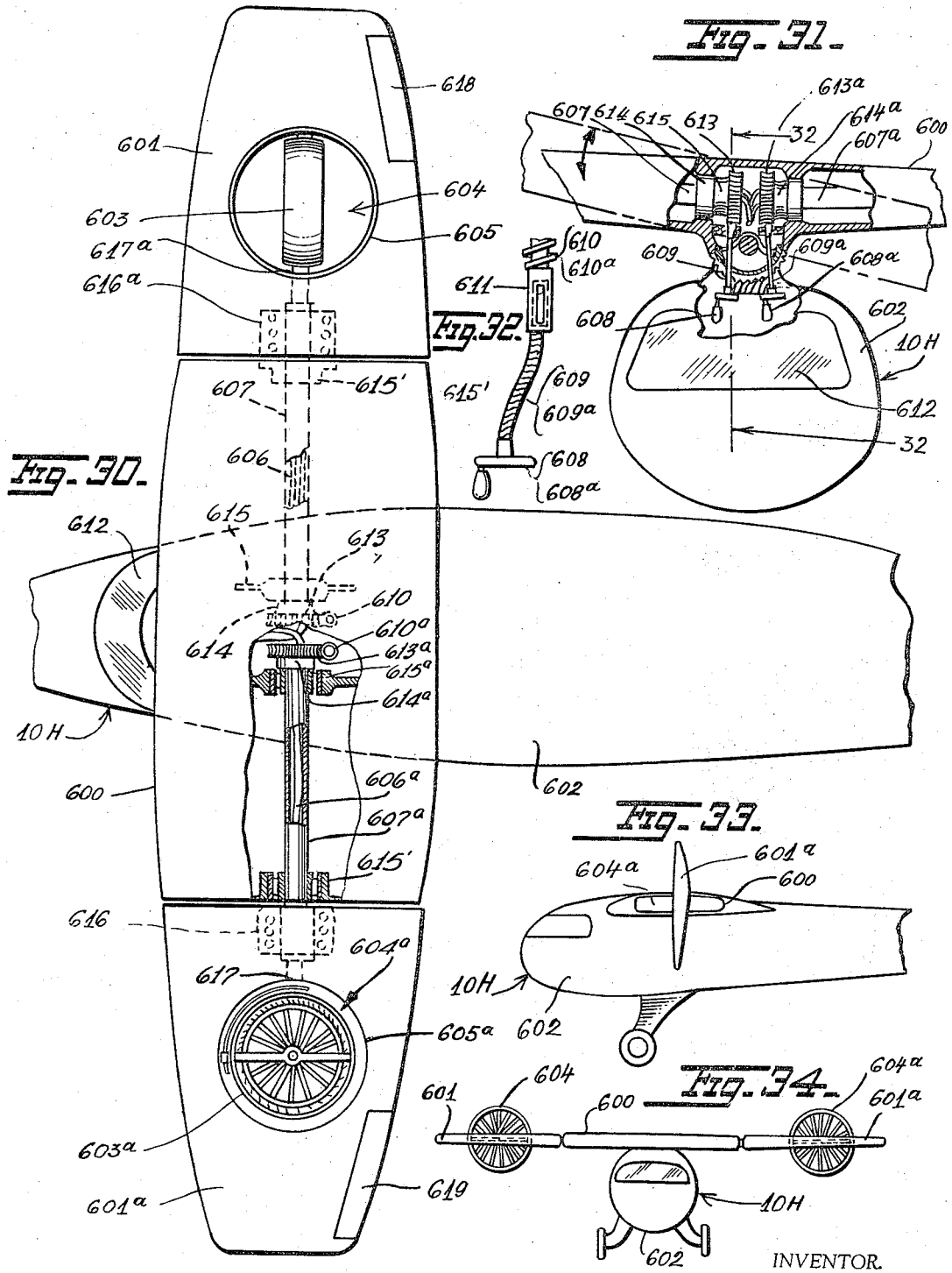

United States Patent Office 3,335,977
Patented Aug. 15, 1967

3,335,977
CONVERTIPLANE
Ludwig F. Meditz, 419 E. 12th St.,
New York, N.Y. 10009
Filed June 16, 1965, Ser. No. 464,420
3 Claims. (Cl. 244—12)

This invention relates to the art of aircraft construction and more particularly concerns an aircraft having pivotable wing ducts with propeller fans therein, such aircraft being generally called a "convertiplane."

The invention is directed at an airplane capable of vertical take-off and landing, hovering flight and horizontal flight. The airplane has a fuselage with laterally extending wings in which are installed angularly-pivotable ducted fan units. These ducted fan units can be rotated between horizontal and vertical positions under control of the pilot. These ducted fan units further carry parallel vanes or other means which can be pivoted for positioning the aircraft to the right or left while taking off and making landing, and when the units are in their horizontal positions. The aircraft is intended to fly faster in horizontal flight than conventional helicopters, carry a heavier payload, and in addition provide the advantages of vertical take-off, vertical landing and hovering flight.

The fan units can be installed in the single wing of a high wing monoplane according to another form of the invention. The wing itself can be tiltably mounted on the fuselage of the monoplane. Alternatively, a single angularly-pivotable ducted fan unit may be installed in the single tiltable wing or a monoplane. The fan units can be carried on tiltable arms disposed above a single wing secured to the fuselage of a monoplane. Two angularly-pivotable fan units can be installed in the single wing of a high wing monoplane. Also, the propellers of the fan units in the wings of an aircraft can be driven by the exhaust of a jet engine in the aircraft against the small vanes or buckets on the periphery of the fan assembly.

It is a principal object of the invention to provide an improved aircraft having wing fans which are angularly adjustable between a horizontal position for hovering, vertical landing and vertical take-off, and intermediate and vertical positions for forward flight and directional control.

Another object of the invention is to provide an aircraft as described having angularly pivotable ducted fan units in the wings with wing flaps in rear of the fan unit and in the air stream therefrom so that when the fan units are in their vertical positions for forward flight to minimize turbulence over the portion of the wing in the rear thereof and means interconnecting the fan unit and these flaps to cause the flaps to be similarly angled therewith.

A still further object of the invention is to provide a high wing monoplane with one or two ducted fan units mounted in the wing, the wing being fixed or tiltably mounted on the fuselage of the aircraft.

Another object of the invention is to provide ducted fan units in the wing of a monoplane, wherein the fan units may be driven by the exhaust of a jet engine directed against the periphery of the fan.

Another object of this invention is to provide novel means for mounting the fan units in the wings for pivotable adjustment and novel control mechanism for effecting the adjustment of ducted fan units and auxiliary flaps relative to each other and relative to the wings.

A further object of this invention is to provide pivotable wing members turnably attached to the end or tip portions of the horizontally positioned main wing.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

FIG. 4 is an enlarged vertical sectional view taken on line 4—4 of FIG. 2.

FIG. 5 is an enlarged sectional view partially diagrammatic in form, taken generally on line 5—5 of FIG. 4 and through the ducted unit.

FIG. 6 is an enlarged fragmentary sectional view of the ducted unit taken generally on line 6—6 of FIG. 4.

FIG. 7 is an enlarged sectional view taken through the wing and similar to FIG. 4, but showing a ducted fan unit adjusted to its horizontal position for take-off landing, hovering and landing.

FIG. 8 is a rear elevational view of the aircraft on the same scale as in FIG. 3, with the end of one wing being broken away.

FIG. 9 is a fragmentary plan view of parts of the control apparatus for effecting the adjustment of the ducted fan units.

FIG. 10 is a fragmentary top plan view of a high wing monoplane with ducted fan units located at opposite sides thereof, and with the wing being tiltable about a longitudinal axis disposed in the vertical plane of the fuselage.

FIG. 11 is a fragmentary front elevational view of the monoplane shown in FIG. 10, illustrating a tilted position of the wing.

FIG. 12 is an enlarged fragmentary sectional view of the monoplane of FIGS. 10, 11, showing motor-driven apparatus and a pivotal bearing connecting and being adapted to tilt the wing in relationship to the fuselage, as indicated on line 12—12 of FIG. 10.

FIG. 13 is an enlarged fragmentary vertical sectional view taken on line 13—13 of FIG. 12 and showing one of the pivot-bearings.

FIG. 14 is a top plan view of another embodiment of a high wing monoplane with the wing pivotally mounted upon the fuselage, with an axially extended wing section and a solitary adjustable fan unit mounted centrally in the wing.

FIG. 15 is a fragmentary top plan view of a high wing monoplane with the wing fixed to the fuselage and two fan units operable therein being mounted on ends of radial arms extending from a central pivotable support on the top of the fuselage.

FIG. 16 is an enlarged fragmentary plan view of the monoplane of FIG. 15, showing the operating mechanism for the fan units and the adjustable gearing therefor.

FIG. 17 is a reduced fragmentary front elevational view of the monoplane shown in FIGS. 15 and 16 with the fan units displaced with respect to the wing.

FIG. 18 is a top plan view of a single wing monoplane with the wing surfaces axially extended over the fuselage with the fan units being tiltable in openings in the wings at the opposite sides of the fuselage and driven by a central engine.

FIG. 19 is a top plan view of an aircraft with tiltable fan units shown in positions perpendicular to each other and driven by a jet engine in the airplane.

FIG. 20 is an enlarged fragmentary plan view of a wing part of the aircraft of FIG. 19, depicting fan unit and associated components.

FIG. 21 is a fragmentary plan view of part of an adjustment mechanism employed in the airplane of FIGS. 19, 20.

FIG. 22 is a fragmentary sectional view partially in front elevation, showing a tiltable fan unit disposed in an airplane wing.

FIG. 23 is a fragmentary top plan view of a monoplane with a single ducted fan unit mounted therein.

FIG. 24 is a fragmentary side elevational view of the monoplane of FIG. 23.

FIG. 25 is an enlarged fragmentary sectional view through the wing of the monoplane of FIGS. 23, 24 showing a flap tilting mechanism therein.

FIG. 26 is a fragmentary side view of a wing tilting mechanism employed in aircraft of FIGS. 23, 24.

FIG. 27 is a side view of a ducted fan unit with tiltable vanes.

FIG. 28 is a perspective view of the tiltable vanes of FIG. 27.

FIG. 29 is an enlarged sectional view taken on line 29—29 of FIG. 27.

FIG. 30 is a top plan view of the aircraft with a part of fuselage broken away, and portions of its wings are adapted for adjustment to the vertical position.

FIG. 31 is a fragmentary front elevational view of the aircraft shown in FIG. 30, depicting the tiltable mechanism of the wing.

FIG. 32 is a flexible shaft arrangement of the aircraft shown in FIG. 31, as indicated on line 32, 32 of FIG. 31.

FIG. 33 is a fragmentary side elevational view of the aircraft shown in FIG. 30, wherein the movable wing portion is positioned in a vertical direction to effect vertical flight on take-off.

FIG. 34 is a front elevational view of the aircraft shown in FIG. 30 wherein fan units are adjusted in a vertical direction to effect forward flight.

Figures 1, 2, 3:
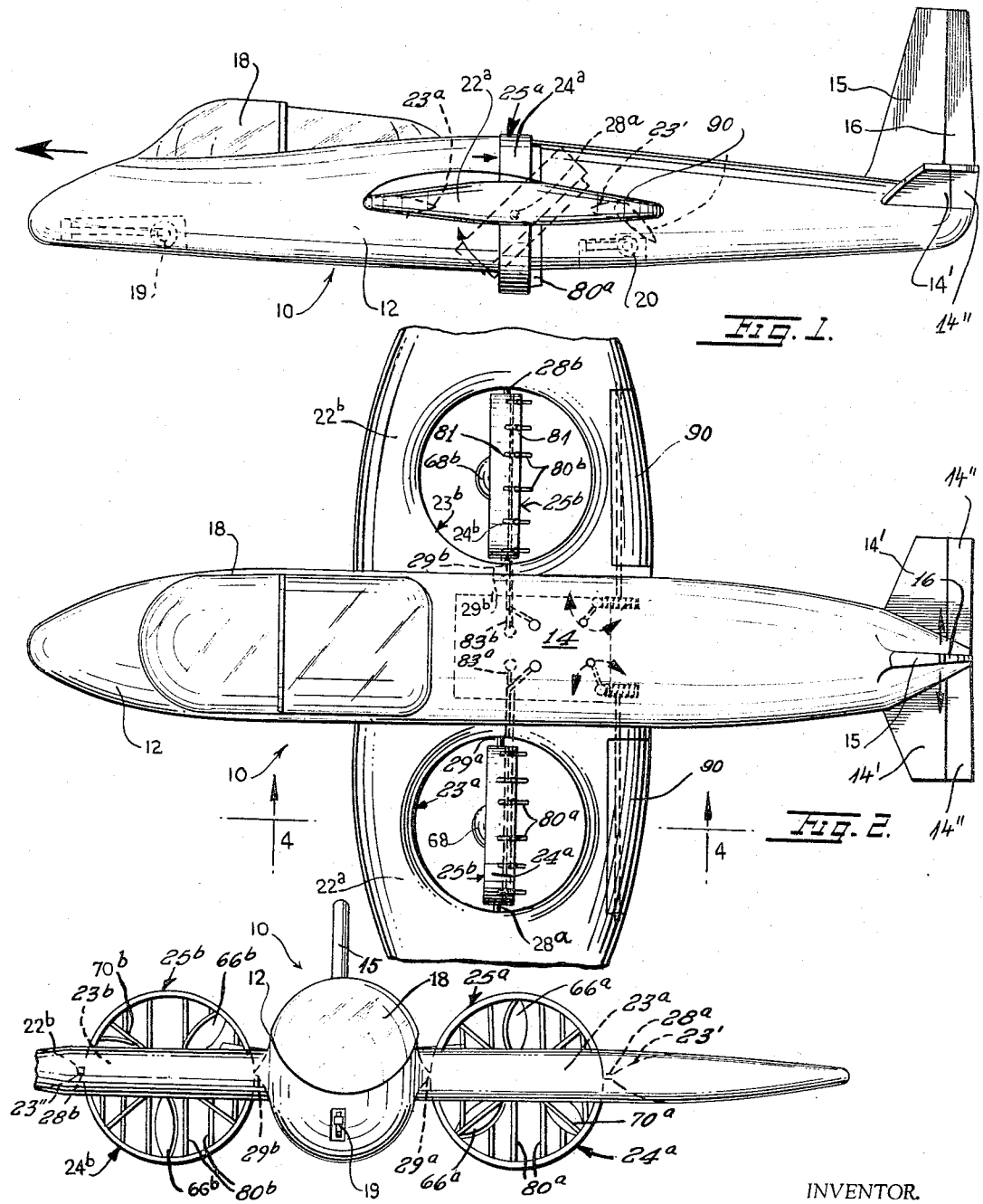
FIGURE 1 is a side elevational view of an aircraft embodying the features of the invention according to one form thereof.
FIG. 2 is a top plan view of the aircraft with the outer portion of the wings being broken away.
FIG. 3 is a front elevational view of the aircraft with the fan units adjusted to their vertical positions to effect horizontal flight, with the end of one wing broken away.

Referring first to FIGURES 1 to 9, there is shown an aircraft 10 having an elongated generally tubular fuselage 12 which is symmetrical on opposite sides of a central vertical plane. Within the fuselage is a turbine or other suitable variable-speed engine diagrammatically indicated at 14 in FIGS. 2 and 5. At the tail end of the fuselage are laterally-extending fixed elevator fins 14′ having movable elevators 14″, and a vertical tail fin 15 to which is pivotally attached a movable rudder 16, all of which being of conventional form. At the forward end of the fuselage is a transparent bubble-type windshield or hood 18 which can be lifted to permit entry and exit of the pilot and passengers. Forward and midway of the fuselage landing wheels are indicated at 19 and 20 in FIGS. 1, 3 and 8 in their retracted positions within the fuselage. To the extent described, the aircraft construction is conventional. Suitable conventinal flaps, fins and controls to correct pitch, yaw and roll are provided for the normal operation of the aircraft while the aircraft is in horizontal flight.

According to the invention, the fuselage 12 is provided with a pair of wings 22a, 22b which are located about midway between the nose and rear ends of the fuselage and extend laterally outwardly from the opposite sides thereof. Each of the wings have round openings or holes 23a, 23b for the ducted fan units. The wings are generally of air foil shape; see FIGS. 1, 2, 4 and 7, but around the openings the wings are flattened somewhat at top and bottom to provide a top surface 23′ and bottom surface 23″. These fan unit openings 23a, 23b are axially vertical and parallel to the longitudinal extending vertical plane of symmetry of the fuselage. The planes of the wings are substantially horizontal and radiating from this fuselage vertical plane. Inside the openings 23a, 23b are cylindrically-shaped ducts 24a, 24b forming parts of ducted fan units 25a, 25b. These fan units with their ducts can be pivoted between the horizontal position shown in FIG. 7 and the vertical position shown in FIG. 4. The ducted fan units 25a, 25b are pivotally mounted in their respective wings by flanged outer stub shafts 28a, 28b, journaled in supports 28a′, 28b′ in the wings, as shown in FIG. 5 and by inner sleeve shafts 29a, 29b, journaled in supports 29a′, 29b′, and extending through inner walls of the wings and side walls of the fuselage 12. These ducted fan units 25a, 25b turn on a common horizontal transverse axis perpendicular to the central axes of the wing openings 23a, 23b and to the vertical plane of symmetry of the fuselage 12. The stub shafts 28a, 28b and the sleeve shafts 29a, 29b are respectively held against axial displacement relative to their respective supports 28a′ and 29a′ by respective rings 28′ and 29′, FIG. 5.

The sleeve shafts 29a, 29b of the fan units as shown in FIGS. 5 and 9 carry spur gears 30a, 30b which mesh with spur gears 32a, 32b carried by shafts 34a, 34b. On the shafts is a worm gear wheel 36a, 36b engaged by worm 38a, 38b mounted on shafts 39a, 39b journaled in supports 40, 41. On these shafts are hand control wheels 42 or other suitable power means which can be manually rotated or powered by the pilot of the airplane to adjust the inclination or position of the fan units 25a, 25b within the openings 23a, 23b.

When the hand wheels 42a, 42b are turned the gears 30a, 30b will be turned and the sleeve shafts 29a, 29b and attached ducted fan units will respectively be rotated to the desired positions and independently of one another. Due to the worm and gear arrangement, the fan units will remain in any position set by the pilot.

Axially-extending through the sleeve shafts 29a, 29b are drive shafts 44a, 44b connected to the engine 14 by any suitable transmission means. The drive shafts 44a, 44b extend axially outward and each carries a bevel gear 45a at its outer end, FIGS. 4, 5. The shafts 44a, 44b are enclosed in bearing sleeve 46a extending radially inward of the ducted fan units 25a, 25b. The outer end of each drive shaft 44a and gear 45a are located inside a gear housing 48a fixedly supported by spider arms 49a or 49b centrally inside the cylindrical housing 24a and 24b. Bearing sleeves 46a terminate at gear housing 48a. Gears 45a mesh with bevel gears 60a carried by stub shafts 62a each fixed to a rotary fan hub 64a. Each fan hub 64a carries preferably variable-pitch, triple fan blades 66a or 66b which extend radially outwardly therefrom. A bearing flange 65a of the hub is rotatably engaged with a fixed bearing flange 65a′ on each gear housing 48a. A stationary fan casing head 68a or 68b is centrally fixedly mounted in the ducted housing 24a or 24b by radial spider arms 70a or 70b. Each fan casing head has a ball bearing case 72a carrying ball bearings 73a engaged with a case 74a carried on the forward side of fan hub 64a. When the engine 14 drives shafts 44a, 44b the fan blades 66a, 66b are rotated in opposite directions by the gears 45a, 60a. Positive drive is maintained of the fan blades 66a, 66b in all the adjusted positions of the ducted fan units 25a, 25b and independently of the control for individual positioning of the ducts 24a, 24b by the gears 30a, 30b, 32a, 32b, 36a, 36b and worm 38a, 38b. The blades 66a, 66b rotate on axes coincident with the axes of the fan duct units 25a, 25b.

Pivotally mounted at the rear ends of each of the fan duct units 25a, 25b are directional control vanes 80a, 80b. These vanes are parallel to each other and are adjustable to guide the aircraft to the right or left upon take-off and landing of the aircraft, only when the fan units are in their horizontal positions as shown in FIG. 7. These vanes are carried by pivotable stub shafts 81a, 82a at their upper and lower ends and journaled in socket openings 81a′, 82a′, in the duct housing 24a, 24b. These vanes are of long strip form and are pivoted from the fuselage by suitable push-pull rods 83a, 83b to extend to the right or left for moving the aircraft to the left or right.

It will be noted in FIGS. 1, 3, 4 and 8 that the ducts are set for rotation of the propeller drive shafts on axes extending longitudinally substantially along the axes of the respective wings 22a, 22b. On take-off, the ducted propellers are rotated to the horizontal position of FIG.

7. Lifting air streams are produced underneath the wings and the fuselage so that the vertical flight begins. Once in the air to obtain forward flight, the propellers are rotated 90 degrees to their vertical positions as shown in FIG. 4. If it is desired simultaneously to have vertical and forward flight, the ducted fan units will be rotated to any position between the horizontal and vertical positions. To obtain reverse movement of the aircraft, as upon landing on difficult terrain or for extreme maneuverability of the aircraft the propellers can be rotated rearwardly up to 90 degrees to a reverse position. Turning of the aircraft in horizontal flight is normally effected by pilot's control of the rudder 16 and elevators 14', and 14" in conventional manner which need not be described here, but the rotation of the ducted fan units can be effected individually or together in opposite direction and can be used to effect the steering and close maneuverability of the aircraft. Flaps 90 pivotable on shafts 91 are provided at the trailing edges of rings 22a, 22b for use in braking the aircraft.

By virtue of the variable pitch propeller blades the aircraft can be made to hover and stay in the air at one location. The ducts serve to concentrate the air streams passing the fan blades for more rapid ascent and forward flight.

Although manual controls are shown for the turning of the braking vanes and ducts, suitable servomotor controls can be substituted if desired.

Referring now to FIGS. 10 and 13, there is shown a monoplane 10A having a fuselage 101 and a high wing 102 mounted on top of the fuselage in longitudinally spaced bearing assemblies 103 and 104. A streamline housing or shield 105 is mounted forwardly of the bearing 103 and leading edge of the wing 102 to cover the bearing supports and any exposed bearing parts thereof.

The fuselage 101 has a windshield 106. Bottom vertical rudder 108 is movable relative to upper vertical rudder 107. Movable horizontal elevators 109 and 109a are mounted on fixed elevator 110, 110a.

The bearing assembly 103 as best seen in FIGS. 12 and 13 includes upwardly extending spaced supports 112 and 113. The leading edge of the wing 102 has depending therefrom an intermediate bearing part 114 and this bearing part is pivotally connected by a longitudinally extending pivot pin 115 extending through the supports 112, 113 on the fuselage. For strengthening purposes, the depending part 114 has inwardly of the wing a longitudinally extending portion 116 connected rigidly with the internal frame structure 117 of the wing 102 in the leading edge thereof.

Symmetrically surrounding the pivot pin 115 and fixed to the rigid part 116 within the wing is a gear segment 118 that meshes with a worm 119. This worm is driven by a reversible, two-direction motor 121 via drive gear 122 that meshes with a gear 123 mounted on shaft 120 extending from the worm 119.

As shown in FIG. 11 this worm may be turned by a hand crank 124. The bearing assembly structure 104 at the trailing edge of the wing except for the arrangement of the segment 119 is constructed like assembly 103.

Fan units 126 and 127 are shown in FIG. 10 and are mounted respectively in wing openings 126' and 127' for adjustment about axes extending transversely of the fore and aft direction of the monoplane 10A in a manner similar to that described in connection with aircraft 10 in FIGS. 1–9.

The fan units will be driven by engine 128 mounted on the wing 102 and incorporating the drive mechanism shown in FIGS. 5 and 9 as well as the tilting mechanism thereof for tilting the units fore and aft between vertical and horizontal positions in their wing openings. It will be understood, however, that the engine may be retained in the fuselage and a flexible drive mechanism may extend to the fan units to drive the same. This will permit tilting of the wing 102 while carrying the fan units without interfering with the drive of the fan units or the fore and aft tilting of the same within the wing openings.

It will be understood that the monoplane 10A, as shown in FIGS. 10 to 13, obtains a lifting effect like that of a helicopter during take-off and landing, and for forward movement in the air there is no need for a counter rotor mounted at the tail. The fan units are individually adjustable and a slight angular adjustment of one relative to the other will effect the steering to the right or to the left while in hovering position or for landing and take-off. In flight for making turns the wing 102 can be tilted to bank, and in cooperation therewith the fan units can be adjusted relative to one another to further assist in the turning of the craft.

Vanes 129 forming parts of the fan units can be used for lateral shifting of the aircraft while hovering as upon take-off and landing in the manner above described; but it may be sufficient to tilt wing 102 so that the vanes 129 will not be needed. Flaps 131 and 132 are located at the trailing edge of wing 102. They can be coordinated with the tilting of the individual fan units to follow the respective angles thereof. As illustrated in FIG. 11, upon the wing 102 being tilted to the dot and line position the aircraft will move laterally to the right of the aircraft in direction of the lowered portion of the wing.

In FIG. 14, there is shown monoplane 10B with a longitudinally extending wing 135 mounted on bearing assemblies 136a, 136b extending upwardly from fuselage 137. The bearing connections of the wing 135 is similar to that shown in FIGS. 12 and 13 of monoplane 10A. A segment gear arrangement 138 is provided upon the forward bearing structure operable by a crank 139 or motor similar to that shown in FIGS. 11 and 12 to effect the tilting of the wing upon its pivot bearing supports.

Instead of having the two fan units in the wing as shown in FIGS. 10 to 13, a solitary fan unit 141 is provided in a central opening 142 in the center of the wing 135 and immediately above the fuselage. This fan unit is mounted on laterally spaced trunnions 143 and 144 and is driven by a self contained power plant or motor 145. Next to this motor is a semicircular wing 149 which extends laterally therefrom and is pivotable or adjustable within the opening 142 along with motor 145 and propeller fan 146. Vanes or louvers 129a having the same function above described for vanes 129 are mounted vertically upon the semicircular wing 149. These vanes are adjustable laterally over the small wing 149.

Internal plates 150a, 150b are located to the rear of fan unit 141. These plates can be adjusted relative to each other to effect steering of the aircraft while it is hovering. Elevators 151 and rudder 152 are provided at the rear of the monoplane. Ailerons 153 and 154 are provided at the trailing edges of the wing 135.

It will be noted that the wing 135 has a generally diamond shape with diagonals located perpendicularly to each other in transverse and fore and aft directions of the monoplane. The elevators 151, 152 constitute extensions of the rear extended portion 135' of the wing.

In FIGS. 15, 16 and 17, monoplane 10C has a single wing 200 secured by struts 202 to the fuselage 204. On the stationary wing is a cylindrical housing 205 pivotally supported on trunnions 206 in the wing. Two arms 208a, 208b extend laterally outward of the housing 205 and carry ducted fan units 210a, 210b.

The fan units include cylindrical ducts 212a, 212b which extend into openings 214a, 214b in the wing at opposite sides of the fuselage 204.

The propellers 217a, 217b are driven via shafts 216 operatively driven by reversible motor 219. Meshed gears 215 at ends of shafts 216 engage gears 213 on propeller drive shafts 230. Gears 218a, 218b on inner ends of shafts 216 engage gear 220 driven via speed reducing gearing in gear box 231, and helical gears 221, 222 driven by motor 219. The motor is located in the fuselage 204.

In order to tilt the propellers on the axes of arms 208a, 208b, there are provided sector gears 234a, 234b engaged by idler gears 236a, 236b mounted on brackets 239a, 239b secured to stationary part 240 connected to the fuselage. Gears 236a, 236b are mounted on shafts 237 which carry gears 241a, 241b. These gears are meshed with a gear 242 carried on a shaft 244 operable by the pilot of the aircraft. When shaft 244 is turned, the sector gears 234a, 234b will be rotated and arms 208a, 208b will turn to rotate the ducted fan units between horizontal and vertical positions. The entire housing 205 can be turned on its axis by actuation of lever 250 under control of the pilot of the aircraft. Lever 250 is connected to sleeve 252 secured to the housing 205. When the lever 250 is turned in one direction or another, the entire housing 205 rotates angularly to lower one ducted fan unit while raising the other one, as indicated by FIG. 17. The housing rotates on its axis and one duct descends in the opening 214a, 214b on the wing while the other fan unit rises. This arrangement makes it possible for the aircraft to bank and turn.

For hovering, descending and rising, the fan units can be turned to the horizontal position shown by fan unit 210b in FIG. 15. The arms 208a, 208b can be rotated by means of shaft 244 which is under the control of the pilot of the aircraft. Vanes 260a, 260b are provided for guiding air through the ducts. Ailerons 262a, 262b and flaps 264a, 264b are provided on the wing for lifting and braking purposes as above described.

The monoplane 10D of FIG. 18 has a generally elliptical high wing 300 in which are mounted rotatable ducted fan units 302a, 302b. The wing is secured to fuselage 301. The fan units have ducts 304 mounted in openings 306 in the wing. The ducts are tiltable in the same manner as described in connection with aircraft 10 of FIGS. 1–9. Behind the openings 306 are tiltable flaps 308. Ailerons 310 and flaps 312 are provided at the trailing edge of the wing. Engine 314 drives the propellers in the fan units as described in connection with aircraft 10.

Aircraft 10E shown in FIGS. 19, 20 and 21 employs a jet engine 350 with divided exhaust outlets 352a, 352b opening into ducts 354a, 354b of fan units 355a, 355b mounted in openings 357, 351' of wings 359a, 359b. The exhaust outlets direct exhaust gas streams upon vanes 366 extending radially outward of rotors 368 in the ducts. In the rotors are vanes 369. The ducts can be tilted on their laterally extending axes by manual operation of levers 370 actuating gears 372 engaged with gears 374 on shafts 376 connected to the ducts. It is possible to adjust the ducts 354a, 354b in their planes by rotating shafts 378 carrying gears 380 meshed with ring gears 382 circumferentially supported in brackets 384. Lift fans 385 and 386 are longitudinally disposed in the fuselage. These fans are not rotatable and are only used for vertical flight.

Aircraft 10F in FIG. 22 shows a ducted fan unit 400 in an opening 402 of a wing 404 connected to fuselage 406. This unit has a duct 407 which is tilted by actuating a cable 408 connected to a link 410 which is pivotally attached to a link 411 secured to fan housing 414. The propeller assembly 415 is journaled in a bearing 416 carried by spider arms 418 in the duct 407.

In FIGS. 23–29, aircraft 10G has a single ducted fan unit 500 having duct 510 pivotally mounted in an opening 502 in a wing 504. The wing is tiltable on the fore and aft axis of the fuselage 503 of the aircraft on trunnions 505, 506 engaged in brackets 509, 510. On the trunnions are sector gears 512, 514 engaged with gears 516, 518 rotatably carried on the brackets. Gear 516 can be manually driven by a belt or chain 520 engaged on a gear 522 driven by a hand operated crank 524.

The ducted fan unit 500 is tiltable by rack gears 545 movable from the cockpit of the aircraft. The rack gears engage gears 546 at the ends of sleeve shafts 548 extending radially out of duct 510; see FIG. 29.

Inside duct 501 are vanes 560a, 560b having tubular ends 564. Shafts 565 are engaged in these tubular ends and carry gears 568 which are engaged by rack gears 570 manually operable by a pilot in the aircraft. The vanes can be individually and independently tilted.

A lever 580 operated by a flexible cable 582 can turn gear 583 meshed with a rack gear 586. This rack is integral with a plate 587 slidable in channel members 591 carried at opposite sides of wing opening 502. At the rear end of plate 587 is a rack gear 585 engaged with a gear 588 secured to a shaft 589 carrying a large rectangular vane 590. When the cable 582 is operated from inside the aircraft fuselage the vane 590 is turned in one direction or another by means of rack gears 585, 586 to perform braking functions for the aircraft. The fan blades 592 of the fan unit are driven by the engine of the aircraft in any one of the ways shown in the previously described fan units.

Monoplane 10H shown in FIGS. 30, 31, 33 and 34 employs a jet engine (not shown) and the main wing member 600, which is fixedly secured to the fuselage 602 in accordance with previously explained arrangement in accordance with FIGS. 12 and 13. On each end of the main wing member 600 there is a pivotable wing member 601, 601 having openings 605, 605a for ducts 603, 603a of fan units 604, 604a and are positioned in spaced proximity and secured to the main wing member by axially turnable shafts 607, 607a. The jet engine employs two divided exhaust cables 606 and 606a located within hollow shafts 607, 607a. Cables 606 and 606a direct exhaust gas upon vanes of rotor blades in ducts 603 and 603a in the similar manner as was previously explained in the arrangement of FIG. 20. These rotors can be tilted as in monoplane 10E, shown in FIG. 19. Furthermore, tilting procedure of main wing member 600 is the same as tilting procedure of wing 102, shown in FIGS. 11 and 12. Flaps 618 and 619 are located at the trailing edge of the pivotable wing members 601, 601a. They may be tilted in accordance with the turning operations of the fan units.

Turnable hollow shafts 607, 607a connect the main wing member 600 with the pivotable wing members 601, 601a as shown in FIGS. 30, 31. By means of these shafts the axially pivotable wing member 601, 601a can be pivoted perpendicular to the horizontally positioned main wing members 600. This procedure is effected by hand crank 608, 608a, which is rigidly connected to vertically positioned flexible shaft 609, 609a. This shaft is attached to a vertical worm 610, 610a by means of locking socket 611, see FIG. 32. Worm 610, 610a engages horizontally positioned worm gear wheel 613, 613a mounted on hub 614, 614a of the rotatable shaft 607, 607a which, in turn, is journaled in supports 615 located near the hub 614, 614a. The other end of the shaft 607, 607a is journaled in supports 615' located at the end of the wing tip of the main wing member 600. These supports are constructed in accordance with the previous explanation related to FIG. 5. As it can be seen from FIG. 30, the shaft 607, 607a is turnably disposed within clamp means 616, 616a of movable wing member 601, 601a. The fan end of shaft 607, 607a is fixedly attached to the side wall 617, 617a of the fan unit 604, 604a.

In accordance with the present invention, the pilot of the monoplane 10H can manually adjust the movable wing members 601, 601a to a vertical position thus making vertical flight or take-off possible, as shown in FIG. 33. If, on the other hand, he desires to fly into forward direction, he can adjust the movable wing members to the horizontal position and adjust fan units to vertical position, as shown in FIG. 30.

While I have illustrated and described the preferred embodiments of my invention, it is to be understood that I do not limit myself to the precise construction herein disclosed and that various changes and modifications may

What is claimed is:

1. In an aircraft having an elongated fuselage symmetrical in form on opposite sides of a vertical plane of symmetry, a variable speed engine in the fuselage located between opposite ends thereof, and elevator fins extending laterally of the fuselage at its tail end, comprising in combination, a pair of wings attached to opposite side walls of the fuselage and extending horizontally laterally outward of said opposite side walls respectively between opposite ends thereof, each of said wings having a cylindrical wing passage axially vertical and perpendicular to the horizontal plane of the wing and parallel to said vertical plane of symmetry, a pair of cylindrical ducts, means rotatably supporting said ducts in said passages respectively to rotate the ducts on a common transverse axis perpendicular to said plane of symmetry and to the central axes of the ducts and passages, so that the ducts are disposable between axially vertical and axially horizontal positions in said passages, fan blades in the ducts operatively connected to and driven by said engine, and support means rotatably supporting said blades for rotation in each duct on an axis coincident with the central axis of the duct, said ducts being located near the bottoms of the wings so that the blades drive air streams through said ducts and under rear portions of the wings and under said elevator fins for keeping the aircraft aloft while the aircraft is propelled forwardly in flight when the ducts are axially horizontal, and whereby the aircraft hovers in air and ascends and descends vertically depending on the speed of rotation of the fan blades when the ducts are axially vertical, vanes mounted in each duct and rotatable between a closed coplanar position perpendicular to the central axis of the duct and spaced parallel open position parallel to the central axis of the duct, and means for rotating the vanes between the open and closed positions for movement of the aircraft in flight.

2. In an aircraft having an elongated fuselage symmetrical in form on opposite sides of a vertical plane of symmetry, a variable speed engine in the fuselage located between opposite ends thereof, and elevator fins extending laterally of the fuselage at its tail end, comprising in combination, a pair of wings attached to opposite side walls of the fuselage and extending horizontally laterally outward of said opposite side walls respectively between opposite ends thereof, each of said wings having a cylindrical wing passage axially vertical and perpendicular to the horizontal plane of the wing and parallel to said vertical plane of symmetry, a pair of cylindrical ducts, sleeve shafts rotatably supporting said ducts in said wing passages for rotating on a common transverse axis perpendicular to said plane of symmetry and to the central axes of the ducts and wing passages, gear means in the fuselage connected to said sleeve shafts for rotating the ducts between axially vertical and axially horizontal positions in the wing passages, and for holding the ducts in set positions of rotation in the wing passages, fan blades in the ducts operatively connected to and driven by said engine, and support means rotatably supporting said blades for rotation in each duct on an axis coincident with the central axis of the duct, said ducts being located near the bottoms of the wings so that the blades drive air streams through said ducts and under rear portions of the wings and under said elevator fins for keeping the aircraft aloft while the aircraft is propelled forwardly in flight when the ducts are axially horizontal, and whereby the aircraft hovers in air and ascends and descends vertically depending on the speed of rotation of the fan blades when the ducts are axially vertical, and vanes mounted in each duct and rotatable between a closed coplanar position perpendicular to the central axis of the duct and a spaced parallel open position parallel to the central axis of the duct.

3. In an aircraft having an elongated fuselage symmetrical in form on opposite sides of a vertical plane of symmetry, a variable speed engine in the fuselage located between opposite ends thereof, and elevator fins extending laterally of the fuselage at its tail end, comprising in combination, a pair of wings attached to opposite side walls of the fuselage and extending horizontally laterally outward of said opposite side walls respectively between opposite ends thereof, each of said wings having cylindrical wing passage axially vertical and perpendicular to the horizontal plane of the wing and parallel to said vertical plane of symmetry, a pair of cylindrical ducts, sleeve shafts rotatably supporting said ducts in said wing passages for rotating on a common transverse axis perpendicular to said plane of symmetry and to the central axes of the ducts and wing passages, gear means in the fuselage connected to said sleeve shafts for rotating the ducts between axially vertical and axially horizontal positions in the wing passages, and for holding the ducts in set positions of rotation in the wing passages, fan blades in the ducts operatively connected to and driven by said engine, and support means rotatably supporting said blades for rotation in each duct on an axis coincident with the central axis of the duct, said ducts being located near the bottoms of the wings so that the blades drive air streams through said ducts and under rear portions of the wings and under said elevator fins for keeping the aircraft aloft while the aircraft is propelled forwardly in flight when the ducts are axially horizontal, and whereby the aircraft hovers in air and ascends and descends vertically depending on the speed of rotation of the fan blades when the ducts are axially vertical, vanes mounted in each duct and rotatable between a closed coplanar position perpendicular to the central axis of the duct and a spaced parallel open position parallel to the central axis of the duct, meshed gears operatively connected to each duct so that the ducts are adapted to mutually rotate in opposite directions, flexible drive shafts operatively connected to the meshed gears for turning the same simultaneously in both ducts, and other means in the fuselage capable of of rotating the vanes and holding the same in set open and closed positions.

References Cited
UNITED STATES PATENTS 2,991,026 7/1961 Nelson et al. _____ 244—12
3,179,353 4/1965 Peterson _____ 244—12

FOREIGN PATENTS 610,133 10/1960 Italy.

MILTON BUCHLER, *Primary Examiner.*
ALFRED E. CORRIGAN, *Examiner.*